INVENTOR.
FRANK C. MOCK

April 4, 1961 F. C. MOCK 2,977,757
GAS TURBINE ENGINE CONTROL
Filed July 12, 1957 4 Sheets-Sheet 2

INVENTOR.
FRANK C. MOCK
BY
James L. O'Brien
ATTORNEY

April 4, 1961  F. C. MOCK  2,977,757
GAS TURBINE ENGINE CONTROL
Filed July 12, 1957  4 Sheets-Sheet 4

INVENTOR.
FRANK C. MOCK
BY
James L. O'Brien
ATTORNEY

United States Patent Office 2,977,757
Patented Apr. 4, 1961

2,977,757
GAS TURBINE ENGINE CONTROL
Frank C. Mock, South Bend, Ind., assignor to The Bendix Corporation, a corporation of Delaware
Filed July 12, 1957, Ser. No. 671,608
3 Claims. (Cl. 60—39.28)

The present invention relates to a control for improving the efficiency and response of a vehicle mounted gas turbine engine.

It is known that the efficiency of a gas turbine engine may be greatly increased by means of a regenerator or heat exchanger wherein exhaust gases are utilized to heat the engine air supply. Unfortunately, a heat exchanger of sufficient capacity to handle the air supply for full power operation of the engine would be excessively large for installation in most modern motor vehicles. It has been found, however, that the heat exchanger increases the efficiency of the gas turbine engine much more at low speeds and loads than at higher speeds and loads. The gas turbine engine used with the control of my invention is provided with a heat exchanger of sufficient capacity to handle low and intermediate air flow but of smaller capacity than is needed for high, full load air flow.

My control regulates the passages of exhaust gas and air flow through the heat exchanger as a function of an engine operating condition such as engine speed, temperature or air flow to obtain optimum efficiency. For high speed operation a by-pass around the heat exchanger is opened to permit additional quantities of air to be supplied to the engine.

The heat exchanger has a large heat capacity and a slow response to changes in power demands. This is a serious disadvantage when the engine is installed on an automobile where wide changes of power are required with a minimum delay in response to the operators movement of the throttle lever. In my invention I correlate the control of fuel supply to the engine with the control of the heat exchanger to accelerate or decelerate the engine with a minimum time lag.

It is an object of my invention to provide a simple, compact control for increasing the efficiency of a gas turbine engine.

It is a further object of my invention to provide means for controlling the temperature of the air supply to a gas turbine engine.

Another object of my invention is to provide a coordinated control for the heat exchanger and fuel supply of a gas turbine engine.

Other objects and advantages of my invention will become readily apparent from the following detailed description taken in connection with the appended drawings in which.

Figure 1:
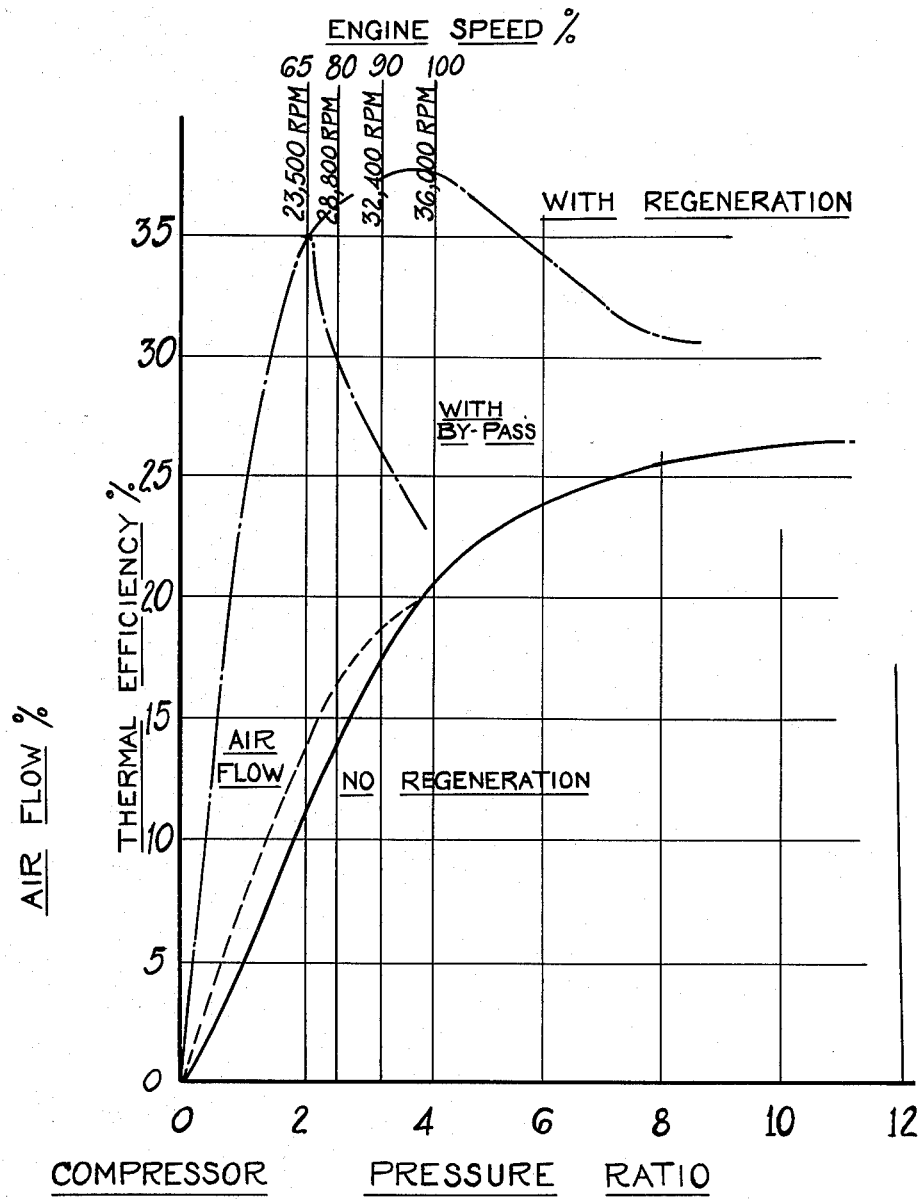
Figure 1 is a graph showing characteristic operating curves of a gas turbine engine having a control embodying my invention.

Referring now to the drawings and more particularly to Figure 1 the solid line represents a characteristic operating curve of a gas turbine engine without a heat exchanger or regenerator. The dash-dot line represents the characteristic operating curve of the same type engine with a heat exchanger.

The curve marked "with by-pass" illustrates the characteristic operating curve of the engine provided with my control wherein all of the air is passed through the regenerator up to about 65% of maximum engine speed. At 65% of maximum speed a by-pass is opened whereupon the efficiency of the engine drops to an intermediate value between the efficiencies of a completely regenerated engine and non-regenreated engine. The range from zero to 65% of engine speed represents the normal operating range of the engine when installed on an automobile and thus my control contributes greatly to the overall increase in efficiency of engine operation through the use of a moderate size heat exchanger and at the same time permits operation at higher speed with more moderate increases in efficiency.

Figure 2:
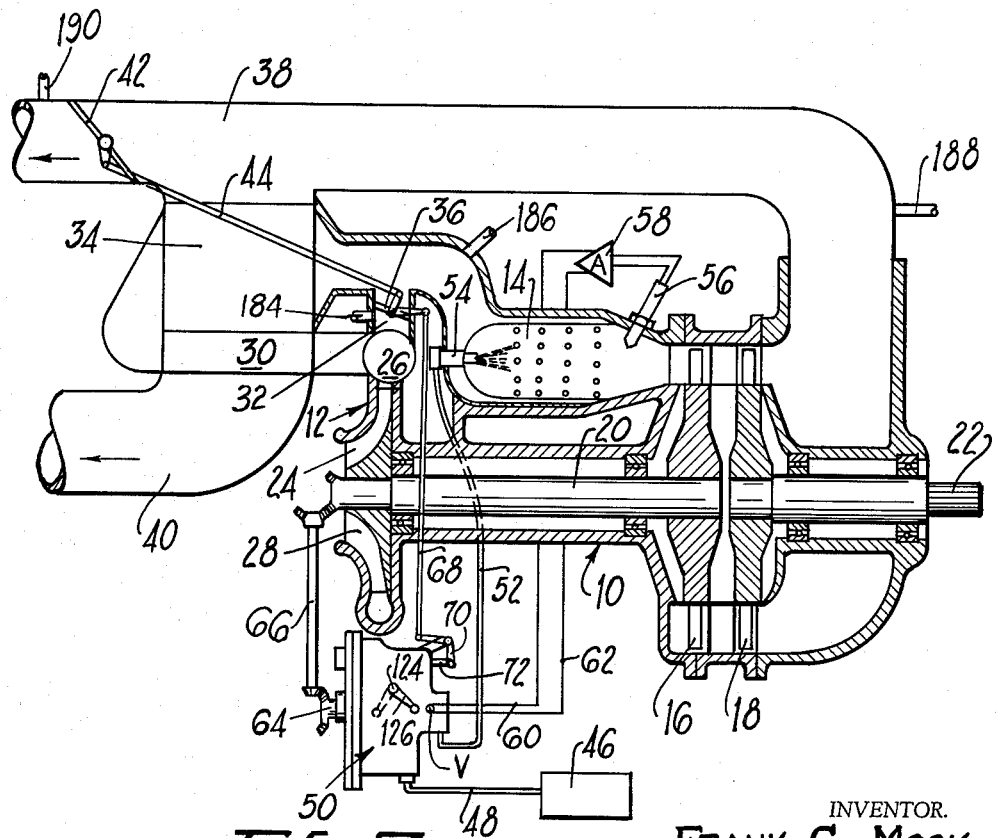
Figure 2 is a schematic view of a gas turbine engine having a control embodying my invention.

Referring now to Figure 2, numeral 10 indicates a gas turbine engine having an air compressor 12, combustion chamber 14 and turbines 16 and 18. Turbine 16 is drivingly connected to compressor 12 by means of shaft 20. Turbine 18 is connected to a shaft 22 which is adapted for connection to the transmission or wheels of the motor vehicle which the subject engine is adapted to drive. Air enters the compressor 12 at inlet 24 and is delivered under pressure to the collector and diffuser 26 by means of centrifugal impeller 28. The collector and diffuser 26 is connected to the combustion chamber 14 by a first flow path 30 and a second flow path 32. Air flowing through the first flow path 30 passes through a stationary heat exchanger or regenerator 34 prior to entering the combustion chamber 14. The second flow path 32 is controlled by a valve 36 which when open permits air from collector diffuser 26 to by-pass the heat exchanger 34 and flow directly to the combustion chamber 14.

The discharge from the combustion chamber 14 is connected to the atmosphere by a first passage 38 and a second passage 40. The second passage 40 is disposed in heat exchange relation to regenerator or heat exchanger 34. The first passage 38 is provided with a valve 42 which when open permits the exhaust gases from combustion chamber 14 to by-pass the heat exchanger 34 and flow directly to the atmosphere. Valves 36 and 42 are connected by a lever 44 for coordinate operation in a manner to be hereinafter described. Fuel is supplied to the combustion chamber 14 from a source 46 through conduit 48, control 50, conduit 52 and nozzle 54. A thermocouple or temperature probe 56 is conveniently mounted in the combustion chamber 14 and is connected with a valve V in control 50 through amplifier 58 and suitable conductors 60, 62. Control 50 is provided with a shaft 64 which is driven as a function of engine speed by rod 66 which is suitably geared to shaft 20. Valve 36 is connected to control 50 by means of lever 68, crank 70 and push rod 72.

Figure 3:
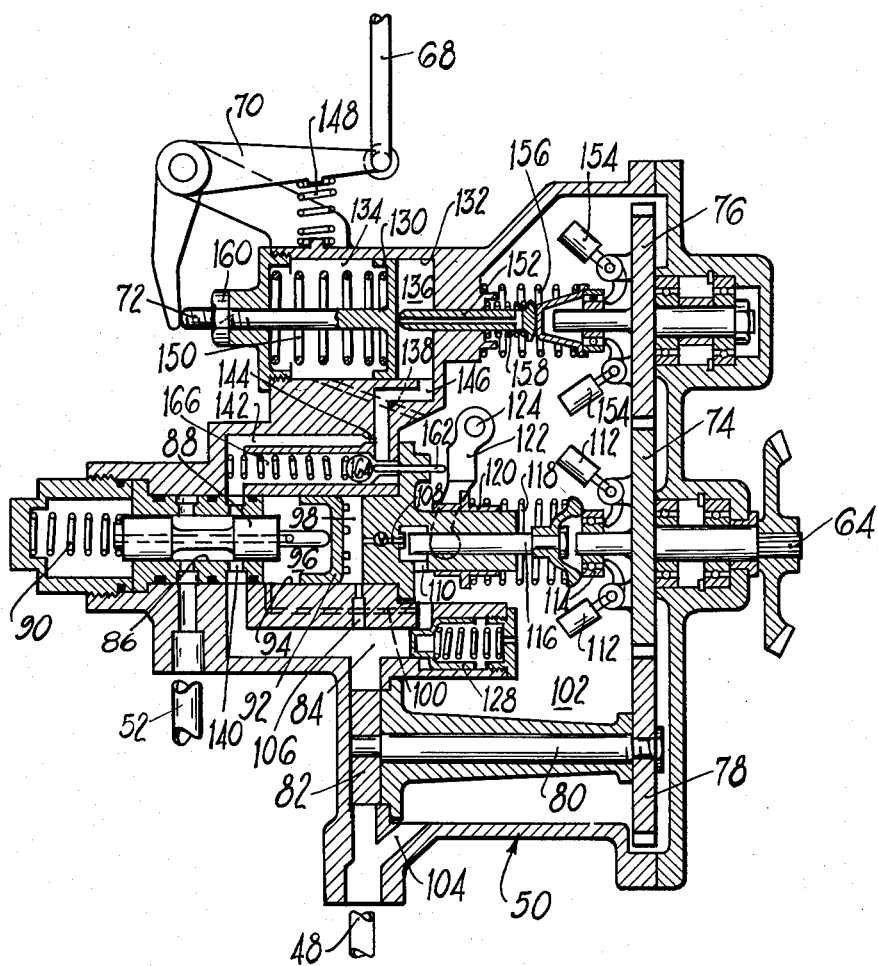
Figure 3 is a vertical sectional view of the control shown in Figure 2.

Referring now to Figure 3 which is a mirror image of a sectional view of control 50 as shown in Figure 2, shaft 64 is secured to a gear 74 which is drivingly meshed with gears 76 and 78. Gear 78 drives a shaft 80 which is secured to a supply pump 82. Pump 82 may be of conventional design adapted to supply fuel to conduit 84 as a function of engine speed. Conduit 84 is connected to a cylinder 86 which is in communication with outlet conduit 52. A spool valve 88 reciprocably disposed in cylinder 86 controls the flow from inlet conduit 84 to outlet conduit 52. A spring 90 urges spool valve 88 to the right to open conduit 84 and is moved to the left to close conduit 84 by a piston 92 which is slidably mounted in cylinder 94. Piston 92 forms a movable wall dividing cylinder 94 into chambers 96 and 98. Chamber 96 is connected to fluid at inlet pressure through conduit 100, chamber 102 and conduit 104. Chamber 98 is connected to the high pressure fluid in conduit 84 by means of passage 106. Chamber 98 is connected to fluid inlet pressure through passage 108, port 110, case chamber 102 and conduit 104. A normally open valve V is located in passage 108 and is adapted to be closed when the temperature sensed by thermocouple 56 reaches a predetermined value.

A pair of governor weights 112 are mounted on gear 74. A ball bearing 114 mounted on an extension of shaft 64 is adapted to be urged to the left by governor weights 112 as the speed of shaft 64 is increased. A rod 116 abuts bearing 114 and is movable to the left thereby to close passage 108 when the engine speed reaches a predetermined selected value. Movement of rod 116 to the left is opposed by a spring 118 which at one end abuts the rod 116 and at the other end a slidable collar 120. Collar 120 is positioned by a bifurcated lever 122 mounted on a shaft 124 which is connected to throttle lever 126.

In the operation of the fuel control thus far described, when the engine is cranked spring 90 urges spool valve to the right permitting high pressure fuel to flow from conduit 84 to outlet conduit 52. Fuel under high pressure from 84 is also supplied to chamber 98 but is permitted to escape through passage 108 to the inlet. As the speed of the engine builds up to the speed selected by the throttle lever 126 the force of the governor weights 112 overcomes the force of spring 118 thereby causing rod 116 to move to the left to close off the passage 108 and prevent the further escape of high pressure fuel from chamber 98. As the pressure in chamber 98 increases to a point sufficient to overcome the force of spring 90, spool valve 88 is moved to the left to slowly cut off conduit 84 and thereby cut off or reduce the supply of fuel to the engine. With the fuel cut off or reduced the engine speed drops to a point where governor weights 112 are no longer sufficient to hold rod 116 against passage 108 in opposition to the spring 118. At that point the passage 108 is open and the pressure reduced in chamber 98 permitting spring 90 to move valve 88 to the right and once again open conduit 84 and restore the supply of fuel to the engine. Conventional anti-hunt or stabilizer apparatus (not shown) may be added to the governor weights 112 should it be necessary for stable operation.

A by-pass valve 128 is provided to connect conduit 84 with the inlet when the fuel pressure in 84 reaches the predetermined value.

Referring now to the air inlet and exhaust valve control shown in Figure 3, push rod 72 is formed integrally with a piston 130 which is reciprocably disposed in a cylinder 132. Cylinder 132 is divided into chambers 134 and 136 by piston 130. Chamber 134 is connected to case chamber 102 by means of passage 138. Chamber 136 is connected to a conduit 84 by means of annular groove 140, conduit 142, restriction 144 and conduit 146. Springs 148 and 150 urge piston 130 to the right in a direction to move crank 70, rod 68 to close valves 36 and 42. Springs 148 and 150 are opposed by the fluid pressure in chamber 136. A drilled rod 152 projects into chamber 136 and is movable to the left by centrifugal weights 154 which are opposed by springs 156 and 158. Weights 154 are mounted on gear 76 to be rotated as a function of engine speed. The piston 130 is initially positioned by adjusting nut 160 so that the drilled rod 152 is spaced from the piston.

In the operation of the inlet and exhaust valve control shown in Figure 3, during cranking and intermediate speed operation high pressure fluid delivered to chamber 136 is permitted to escape through the drilled rod 152 whereby the springs 148 and 150 are effective to close valves 36 and 42. When the engine has reached a predetermined speed centrifugal weights 154 move the drilled rod 152 to the left into engagement with piston 130 thereby cutting off the escape of fuel from chamber 136. The force of high pressure fuel in chamber 136 acting on piston 130 is sufficient to overcome springs 150 and 148 and move the piston 130 to the left to cause the valves 36 and 42 to be moved toward open position. The piston 130 will continue to move to the left until there is sufficient clearance between the piston 130 and the drilled rod 152 for fluid to escape from the chamber 136. Each time the drilled rod hits the face of piston 130 the pressure in chamber 136 is raised causing piston 130 and push rod 72 to move to the left until there is again flow clearance through the drilled rod whereby the travel of push rod 72, crank 70, lever 68 and inlet and exhaust by-pass valves 36 and 42 respectively are moved as a function of centrifugal force versus resistance rate of spring 156 to give the desired relation of by-pass valve area versus engine speed.

During acceleration of the engine, movement of the throttle lever 126 in a speed increasing direction permits spool valve 88 to move toward wide open position thereby establishing maximum fuel flow to the engine. Should the temperature rise in the combustion chamber 14 reach a maximum predetermined temperature, the thermocouple 56 causes valve V to close passage 108 whereby the pressure in chamber 98 builds up to move spool valve 88 to the left to cut off or reduce the fuel supply to the engine until the temperature falls below said predetermined value.

On deceleration there is considerable heat stored in the walls of the heat exchanger causing a pronounced heating effect on the gases entering the combustion chamber so that the power diminuation as the throttle is closed is quite slow. This is overcome in the present invention by coordinately cutting off the fuel supply and opening the intake and exhaust by-pass valves when the throttle is returned to idle position. As shown in Figure 3, this is accomplished when throttle lever 130 is placed in the idle position wherein the bifurcated lever 122 is moved to the left causing rod 116 to seal passage 108 thereby causing valve 88 to cut off the fuel flow. Movement of bifurcated lever 122 to the left also moves rod 162 to push ball valve 164 off its seat permitting high pressure fuel to flow from conduit 84, annular groove 140, conduit 166 and passage 146 to chamber 136. Conduits 166 and 146 are considerably larger than the drilled passage in rod 152 so that pressure will build up in chamber 136 and piston 130 will be driven to the left to open inlet and exhaust by-pass valves 32 and 42 even though drilled rod 152 is not in engagement with piston 130.

Figure 5:
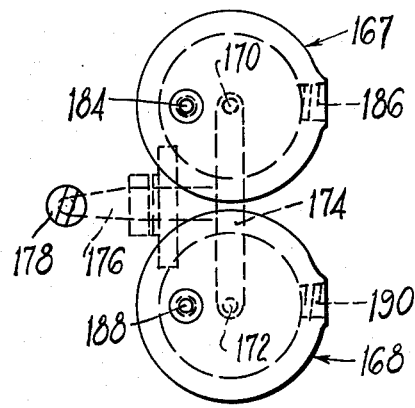
Figure 5 is a fragmentary view of Figure 4 taken in direction of arrows 5—5.
Figure 4:
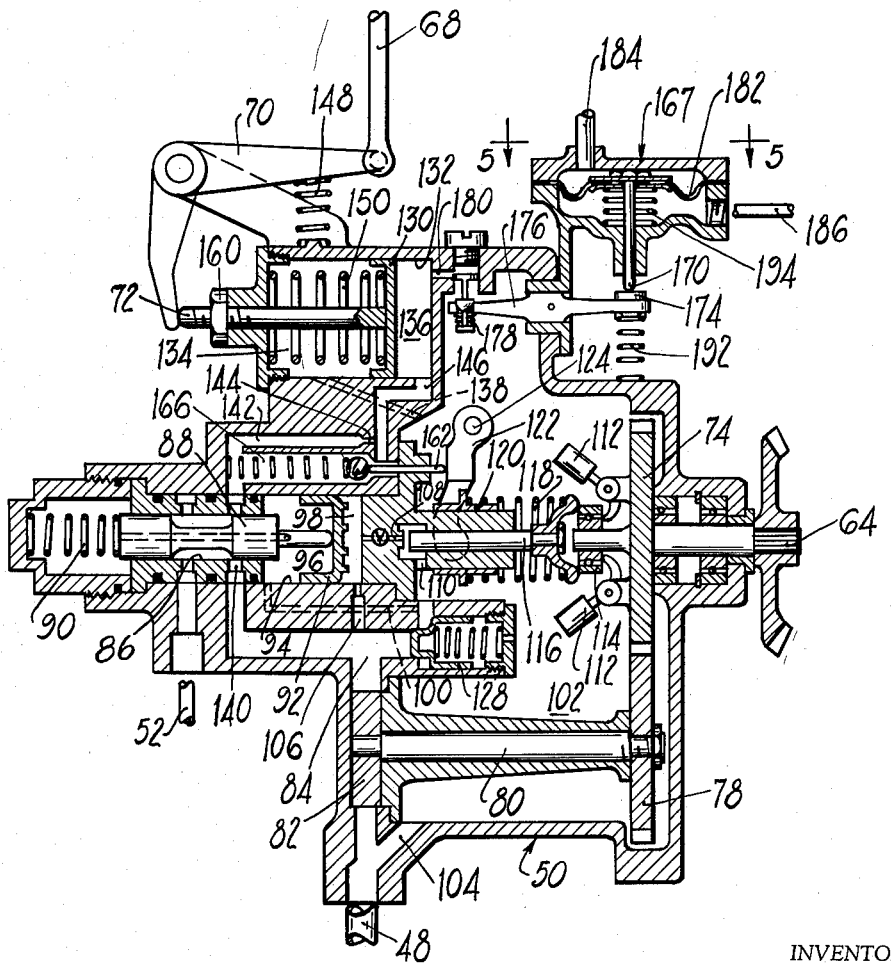
Figure 4 is a sectional view of another embodiment of my control.

Referring now to the embodiment shown in Figures 4 and 5 the fuel control portion is identical to the embodiment shown in Figure 3 and similar numerals have been used to designate similar parts. In the embodiment shown in Figures 4 and 5, control of the inlet and exhaust by-pass valves 36 and 42 respectively is obtained as a function of the pressure drop across said valves. This is accomplished by a pair of diaphragm assemblies 167 and 168 which respectively urge push rods 170 and 172 into engagement with a cross lever 174 which is secured to one end of a rocker 176 which at the other end is provided with a half ball valve 178. Valve 178 is adapted to control the drain passage 180 from chamber 136. Assembly 167 is representative of the construction of assembly 168 and as shown contains a diaphragm 182 which on one side is exposed to the pressure on the upstream side of valve 36 by means of conduit 184 and on the other side is exposed to pressure on the downstream side of valve 36 through conduit 186. Assembly 168 is constructed in the similar manner to assembly 167 with one side of the diaphragm therein being exposed to pressures on the upstream side of valve 42 through conduit 188 and on the other side exposed to pressures downstream of valve 42 through conduit 190. A spring 192 urges rocker 176 in a direction to open valve 178 permitting fluid to drain from chamber 136 whereby spring 150 is effective to hold inlet and exhaust by-pass valves 36 and 42 closed. Spring 192 is opposed by diaphragm assemblies 166 and 168 which whenever the pressure differential across the diaphragm exceeds the force of the spring 194 moves either push rod 170 or 172 into engagement with lever 174 to close the valve 178 whereby fuel at high pressure in chamber 136 is effective to move piston 130 to the left to open valves 36 and 42. Thus, the by-passes of the heat exchanger are controlled by either the exhaust pressure or the compressor pressure differential across the heat exchanger. The exhaust pressure function is probably the most critical since it could happen that the exhaust passages will gradually receive a coat of carbon which, if it accumulates enough to raise the back pressure across turbine 18 might result in an augmented fuel feed through nozzle 54 in order to hold up engine speed, and thereby increase turbine gas temperature above a safe limit.

Although particular embodiments of my invention have been described, it will be understood by those skilled in the art that the objects of the invention may be attained by the use of constructions different in certain respects from that disclosed without departing from the underlying principles of the invention.

I claim:

1. In a gas turbine engine, an air inlet, a combustion chamber, a turbine receiving gas from said chamber, first and second flow paths connecting said inlet to said chamber, a valve in one of said paths, a heater in the other of said paths, first and second passages connecting said turbine to the atmosphere, a valve in one of said passages, and means responsive to the greater pressure differential of the press differentials across said valves for urging both of said valves toward open position at a predetermined pressure differential.

2. A control for a gas turbine engine having an air inlet, a compressor driven by a turbine, a combustion chamber discharging gas to the turbine, and a source of fuel, comprising first and second flow paths connecting said inlet to said chamber, a heater in one of said paths, a valve in the other of said paths, a first conduit connecting said turbine to the atmosphere, a second conduit disposed in heat exchange relation to said heater and connecting said turbine to the atmosphere, a valve in one of said conduits, a passage connecting said source to said chamber, a flow controlling member in said passage, means responsive to the greater pressure differential of the pressure differentials across said valves for urging both of said valves toward open position at a predetermined pressure differential, means responsive to turbine speed for controlling said member, and temperature responsive means for closing said member at a predetermined engine temperature.

3. A control for a gas turbine engine having an air inlet, a compressor driven by a turbine, a combustion chamber discharging gas to the turbine, and a source of fuel under pressure, comprising first and second flow paths connecting said compressor to said chamber, an air valve in one of said paths, a heat exchanger in the other of said paths, a passage connecting said source to said chamber, a fuel valve in said passage, a cylinder, a servo piston in said cylinder dividing the interior thereof into first and second chambers, means operatively connecting said piston to said air valve, resilient means in said first chamber urging said piston in a direction to close said air valve, means connecting said second chamber to said source whereby fuel under pressure acting on said piston urges said piston in a direction to open said air valve, means responsive to turbine speed for controlling the pressure in said second chamber to actuate said piston in an air valve opening direction at a predetermined turbine speed, a throttle lever, a valve actuated by said throttle lever for reducing the pressure in said second chamber when said throttle is in idle position, and means responsive to turbine speed for controlling said fuel valve.

References Cited in the file of this patent

UNITED STATES PATENTS

| 2,643,514 | Jubb | June 30, 1953 |
| 2,713,245 | Weaving | July 19, 1955 |
| 2,873,576 | Lombard | Feb. 17, 1959 |

FOREIGN PATENTS

| 525,550 | Great Britain | Aug. 30, 1940 |
| 651,771 | Great Britain | Apr. 11, 1951 |

UNITED STATES PATENT OFFICE
CERTIFICATE OF CORRECTION

Patent No. 2,977,757 April 4, 1961

Frank C. Mock

It is hereby certified that error appears in the above numbered patent requiring correction and that the said Letters Patent should read as corrected below.

Column 5, line 35, for "press" read -- pressure --.

Signed and sealed this 12th day of September 1961.

(SEAL)
Attest:

ERNEST W. SWIDER
Attesting Officer

DAVID L. LADD
Commissioner of P